(12) United States Patent
Ganti et al.

(10) Patent No.: US 6,291,919 B1
(45) Date of Patent: Sep. 18, 2001

(54) CONDUCTIVE STRUCTURAL INTERFACE FOR A NON-METALLIC ROTOR ENCLOSURE

(75) Inventors: Suryaprakash Ganti; Christopher A. Kaminski; Yu Wang; MVK Chari; MV Srinivas, all of Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/491,572

(22) Filed: Jan. 26, 2000

(51) Int. Cl.[7] ........................................ H02K 1/32
(52) U.S. Cl. ..................... 310/261; 310/61; 310/264; 310/52; 310/214
(58) Field of Search .............................. 310/261, 61, 52, 310/60 R, 85, 264, 265, 271, 262, 214

(56) References Cited

U.S. PATENT DOCUMENTS

| | | | |
|---|---|---|---|
| 2,630,463 | * 3/1953 | Smith | 310/261 |
| 2,951,954 | * 9/1960 | Willyoung | 310/61 |
| 3,991,333 | * 11/1976 | Laskaris | 310/52 |
| 4,139,789 | * 2/1979 | Hunt | 310/40 R |
| 4,146,809 | * 3/1979 | Reilly | 310/261 |
| 4,930,201 | * 6/1990 | Brown | 310/42 |
| 5,166,569 | * 11/1992 | Shervington et al. | 310/261 |

FOREIGN PATENT DOCUMENTS 58-46856  *  3/1983  (JP) ................................ H02K/21/08

* cited by examiner

*Primary Examiner*—Burton S. Mullins
(74) *Attorney, Agent, or Firm*—Nixon & Vanderhye P.C.

(57) ABSTRACT

An electrically conductive enclosure shield is disposed between a rotor enclosure and the rotor winding assemblies. The shield reduces transverse shear loads generated by non-uniform centrifugal radial forces in a generator rotor, while providing adequate electromagnetic shielding for the field winding. Ventilation holes in the shield enable ventilation gas discharge, and shallow ridges may be provided that serve as axial positioning guides for enclosure rings. Additionally, the enclosure shield advantageously adds axial stiffness to the rotor.

12 Claims, 8 Drawing Sheets

CONDUCTIVE STRUCTURAL INTERFACE FOR A NON-METALLIC ROTOR ENCLOSURE

BACKGROUND OF THE INVENTION

The present invention relates to generators and, more particularly, to a conductive structural interface for an enclosure for a generator rotor.

In a conventional generator having a rotor and a stator, the rotor is provided with field windings that excite the generator while receiving a current from an exciting current source. The stator is provided with armature windings from which electrical power is output. Typical rotor construction requires that a field winding be assembled bar by bar, into radial slots milled into a rotor forging. Containment of the rotor field windings is typically achieved using rotor wedges, rotor teeth and retaining rings.

It is desirable to replace the bar by bar assembly with a solid rotor having parallel slots milled into a rotor forging. With this structure, the containment components could be replaced with a simplified enclosure.

When composite enclosures are loaded with non-uniform centrifugal radial forces, transverse shear is developed, which may introduce significant inter-laminar shear stresses into the composite enclosure. Additionally, the electrical conductivity of composite enclosures is too low to provide adequate electromagnetic shielding for the field winding. It is thus desirable to provide an interface between the enclosure and the field winding that reduces the shear load on the enclosure, provides electromagnetic shielding of the field winding with good electrical contact with the pole, provides a means of discharging ventilation to the air gap, provides axial stiffness to the structure, and enables axial positioning of individual enclosure rings.

BRIEF SUMMARY OF THE INVENTION

In an exemplary embodiment of the invention, an enclosure shield is provided for a rotor enclosure in a generator including a rotor and a stator. The enclosure is formed of a non-metallic tube for containing a magnetic core and corresponding winding assemblies of the rotor. The enclosure shield is formed of an electrically conductive material shaped corresponding to an inside diameter of the rotor enclosure and including ventilation holes. In one arrangement, the enclosure shield is formed of a plurality of pieces. In this context, each of the plurality of pieces includes structure that extends into notches in the magnetic core. Each of the plurality of pieces may be sized to span a pole face of the magnetic core. A minimum thickness of the enclosure shield is preferably greater than an eddy current skin depth.

In another exemplary embodiment of the invention, a rotor in a generator includes a magnetic core having at least two poles, a plurality of winding assemblies, one for each pole, an enclosure formed of a non-metallic tube housing the core and the winding assemblies, and an enclosure shield disposed between the enclosure and the winding assemblies. The enclosure shield is formed of an electrically conductive material and is shaped corresponding to an inside diameter of the enclosure. The enclosure shield includes ventilation holes. Similar to the above-noted exemplary embodiments, the enclosure shield may be formed of a plurality of pieces. In this context, the plurality of pieces adjoin along a quadrature axis and at an axial midpoint of the rotor.

DETAILED DESCRIPTION OF THE INVENTION

Figure 1:
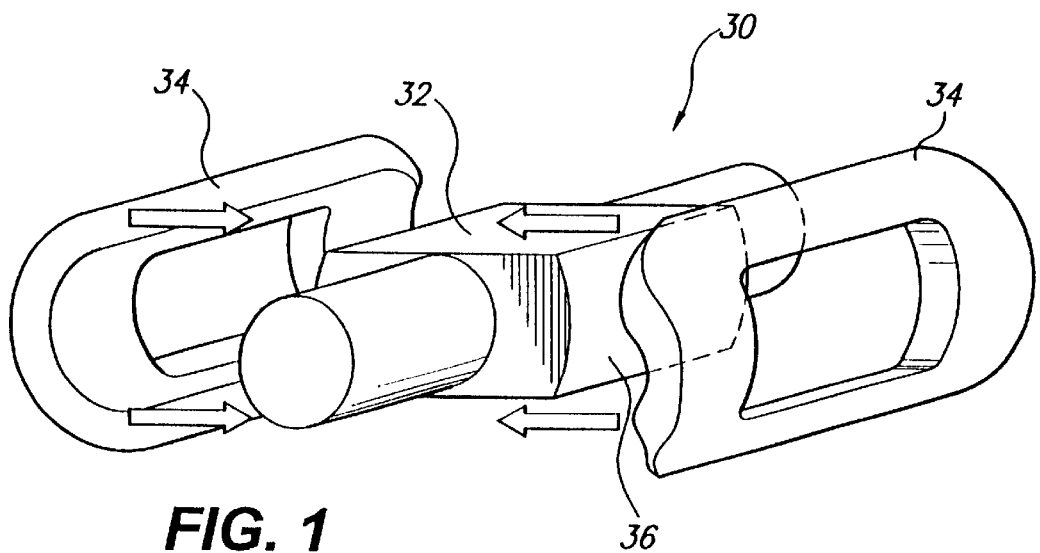
FIG. 1 is a winding assembly drawing of a generator rotor.
Figure 2:
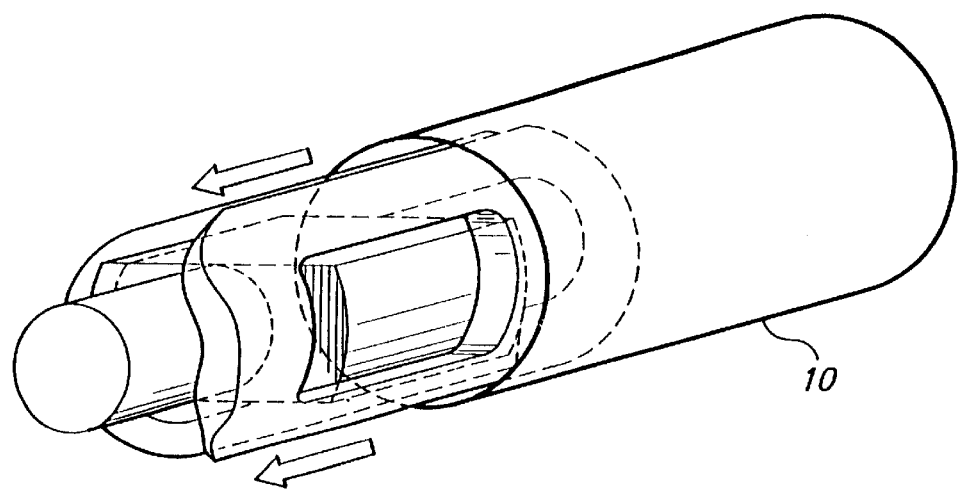
FIG. 2 is an assembly drawing of a generator rotor including the enclosure of the present invention.

With reference to FIGS. 1 and 2, a generator rotor 30 includes a multi-pole magnetic core 32 (two-pole core shown) and a plurality of winding assemblies 34, one for each pole, and corresponding pole faces 36. The construction and materials of the magnetic core 32 and winding assemblies 34 are known, and details thereof will not be further provided.

After the winding assemblies 34 are slid over the parallel sided forging of the two-pole magnetic core 32, an enclosure 10 is slid over the assembly. The enclosure 10 is preferably constructed from a low density composite material, such as a carbon fiber—glass fiber composite, and is configured to provide a means for discharging winding ventilation gas to a generator air gap 12 (see FIG. 3). The composite material is preferred because of its high strength to weight ratio. Other materials may also be suitable as would be apparent to those of ordinary skill in the art, and the invention is not meant to be particularly limited to the disclosed example.

With reference to FIGS. 4–9, an enclosure shield 40 is disposed between the enclosure 10 and the winding assemblies 34. The enclosure shield 40 provides an interface between the enclosure 10 and the winding assemblies 34, which reduces the shear load on the enclosure 10. The enclosure shield 40 is formed of an electrically conductive material, such as aluminum, and thus provides adequate electromagnetic shielding for the rotor filed winding with good electrical contact with the magnetic core poles, while also providing axial stiffness to the winding structure. A minimum thickness of the shield 40 is preferably greater than an eddy current skin depth to provide adequate shielding against magnetic field harmonics.

The enclosure shield 40 is perforated with a plurality of ventilation holes 42, which serve to discharge ventilation to the air gap 12.

Figure 3:
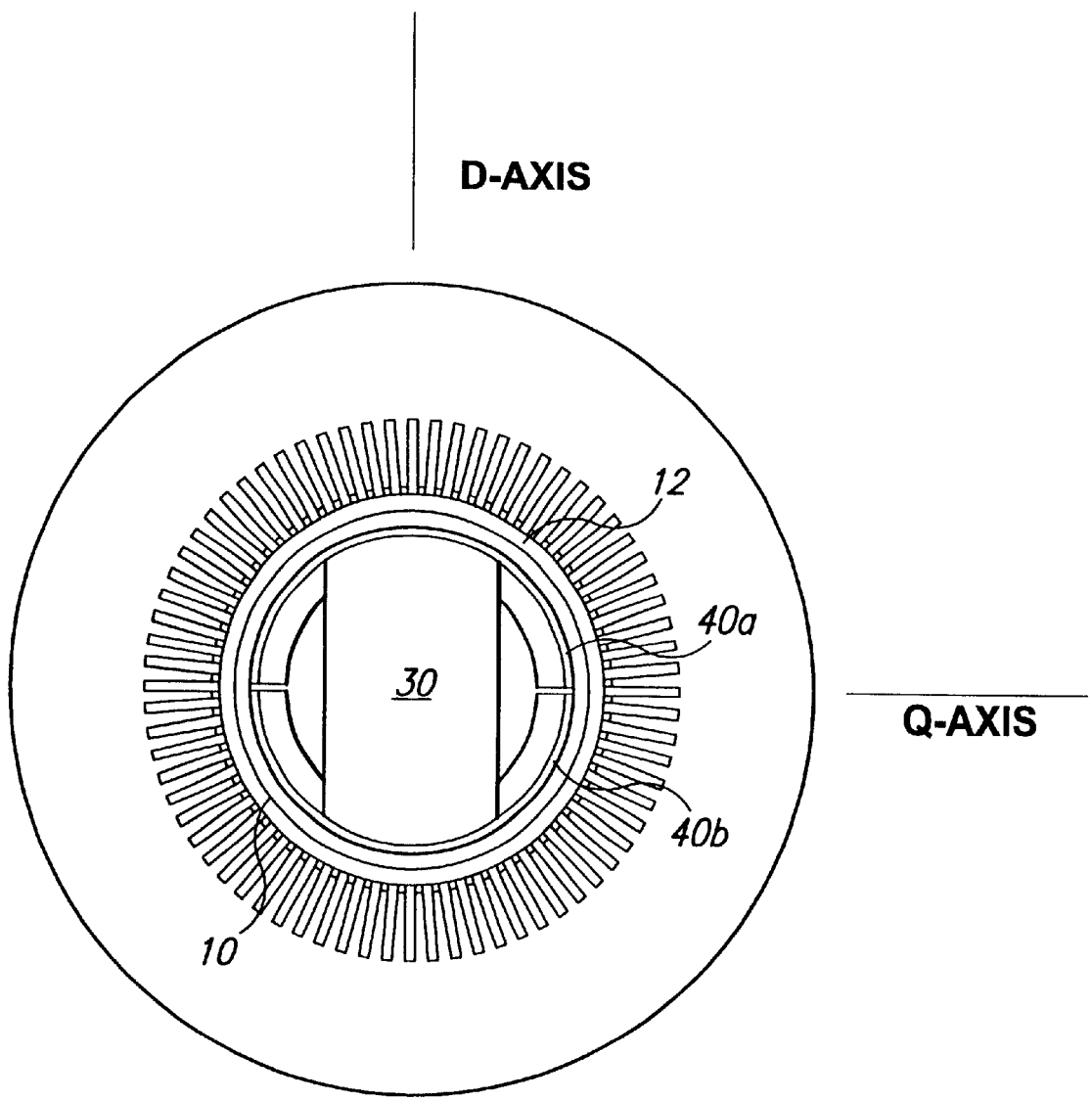
FIG. 3 is a schematic illustration of a generator rotor and stator and the enclosure of the present invention.
Figure 4:
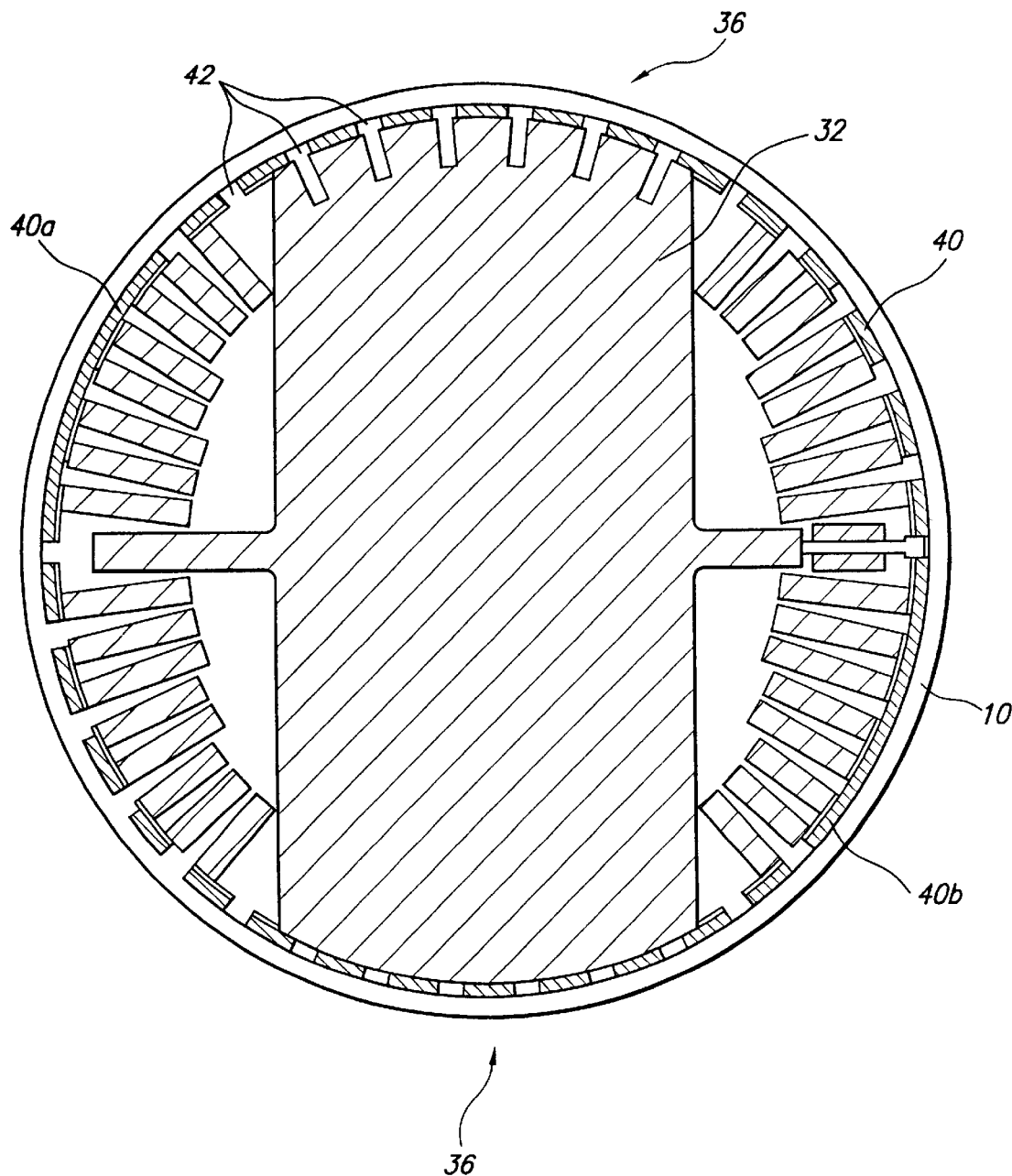
FIG. 4 shows the shield spanning the pole faces in one arrangement.
Figure 5:
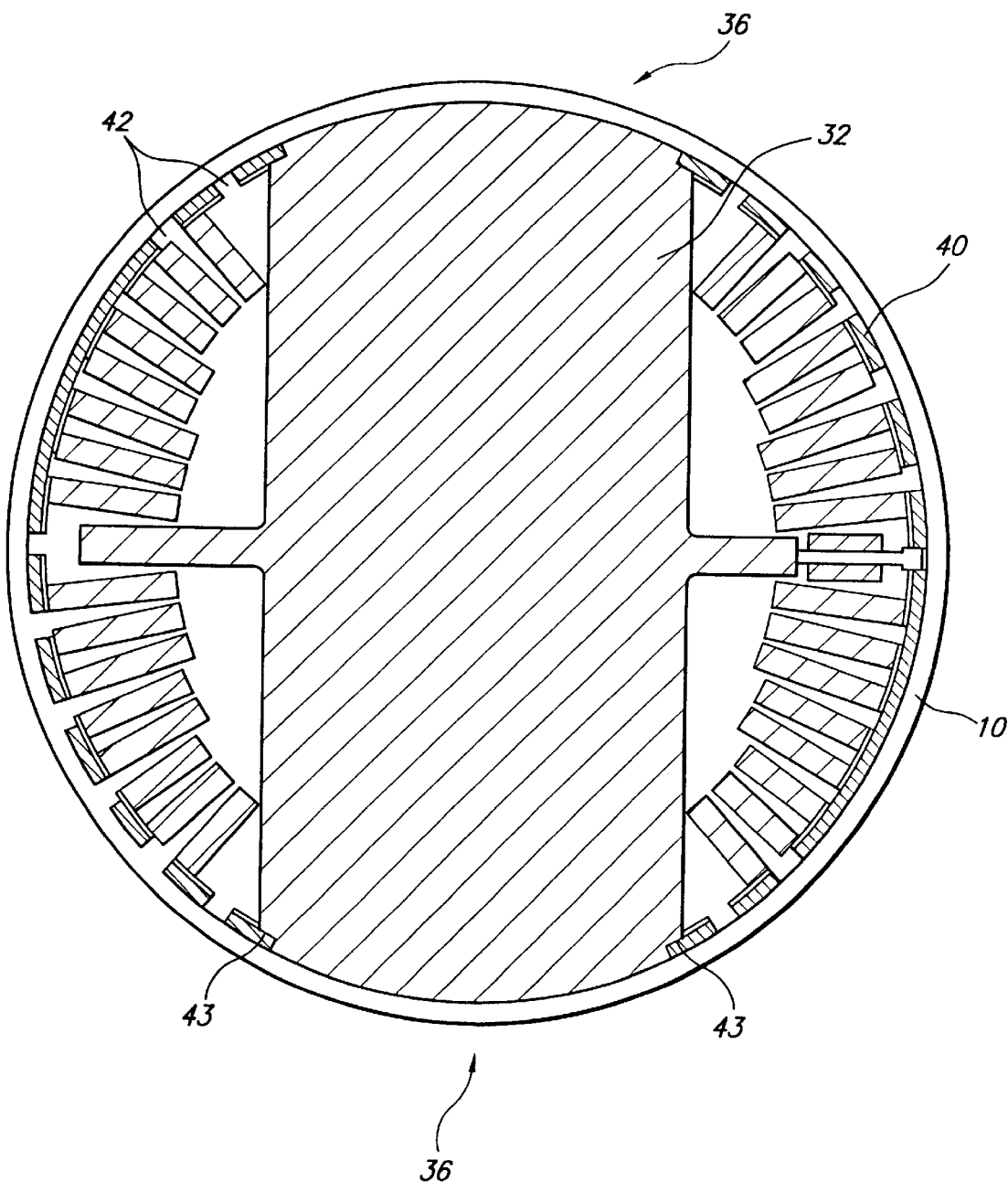
FIG. 5 shows the shield extending into notches in the pole.
Figure 6:
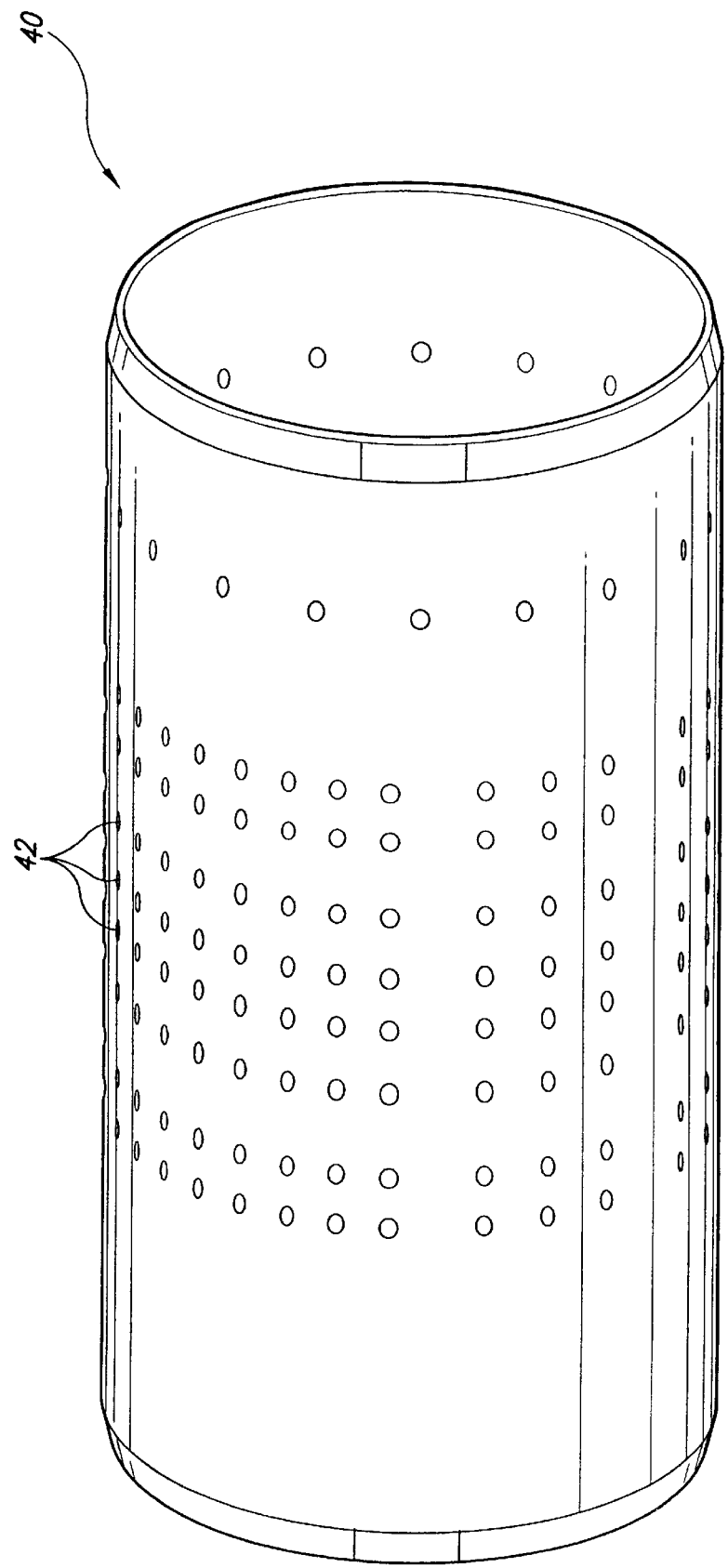
FIG. 6 is a perspective view showing a one-piece shield.
Figure 7:
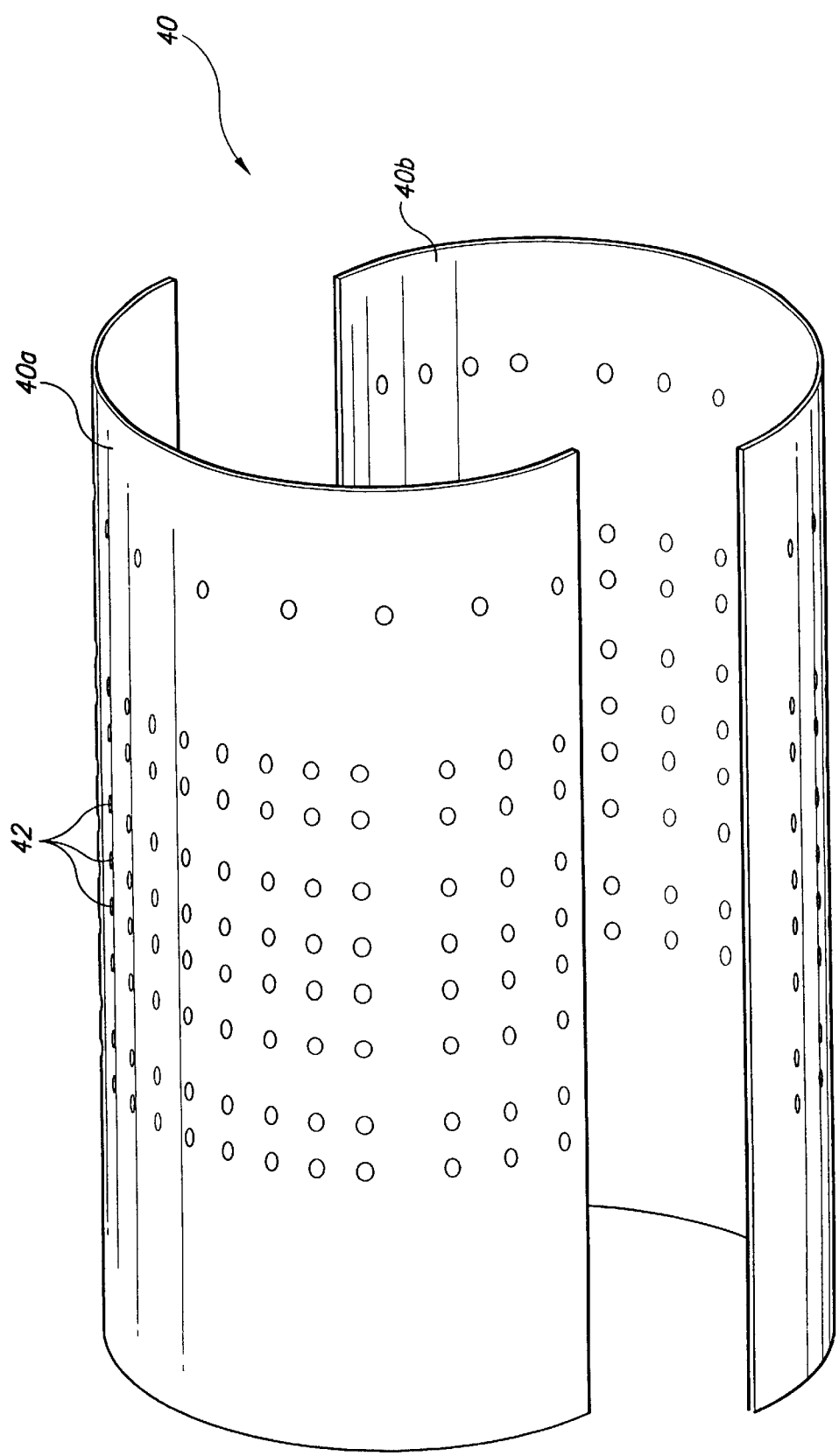
FIG. 7 is a perspective view showing a two-piece shield.

The enclosure shield 40 may be formed of a single piece as shown in FIG. 6 or of a plurality of pieces, such as two pieces 40a, 40b (FIGS. 3, 7 and 8) or more than tow pieces (FIG. 9) that are shaped corresponding to an inside diameter of the enclosure 10. The individual pieces either span the pole faces 36 as shown in FIG. 4 or extend into notches 43 in the pole as shown in FIG. 5. The pieces preferably adjoin along the quadrature axis Q, and at the axial midpoint of the rotor body as shown in FIG. 3.

Figure 8:
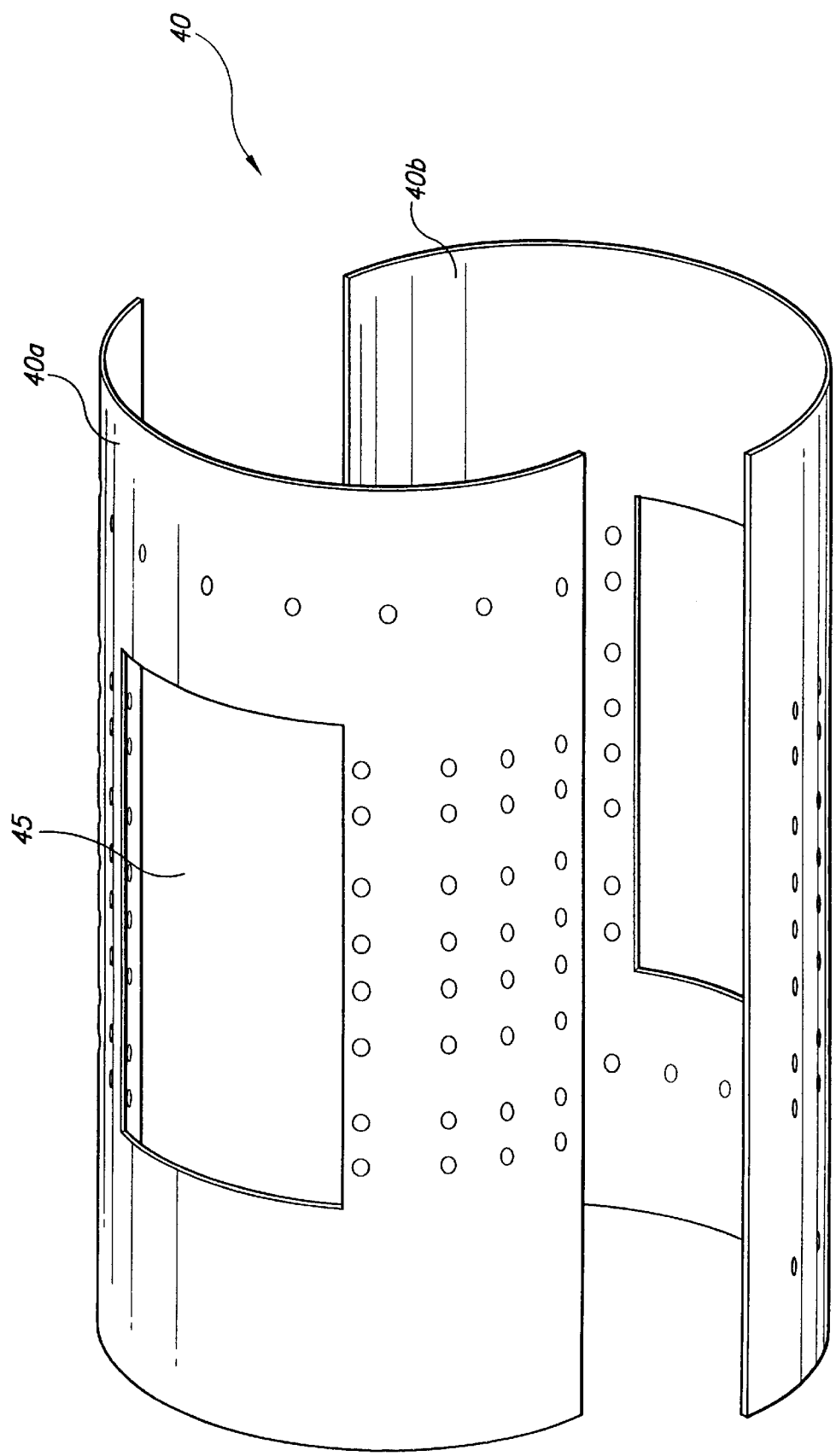
FIG. 8 is a perspective view showing a two-piece shield including openings for the poles.
Figure 9:
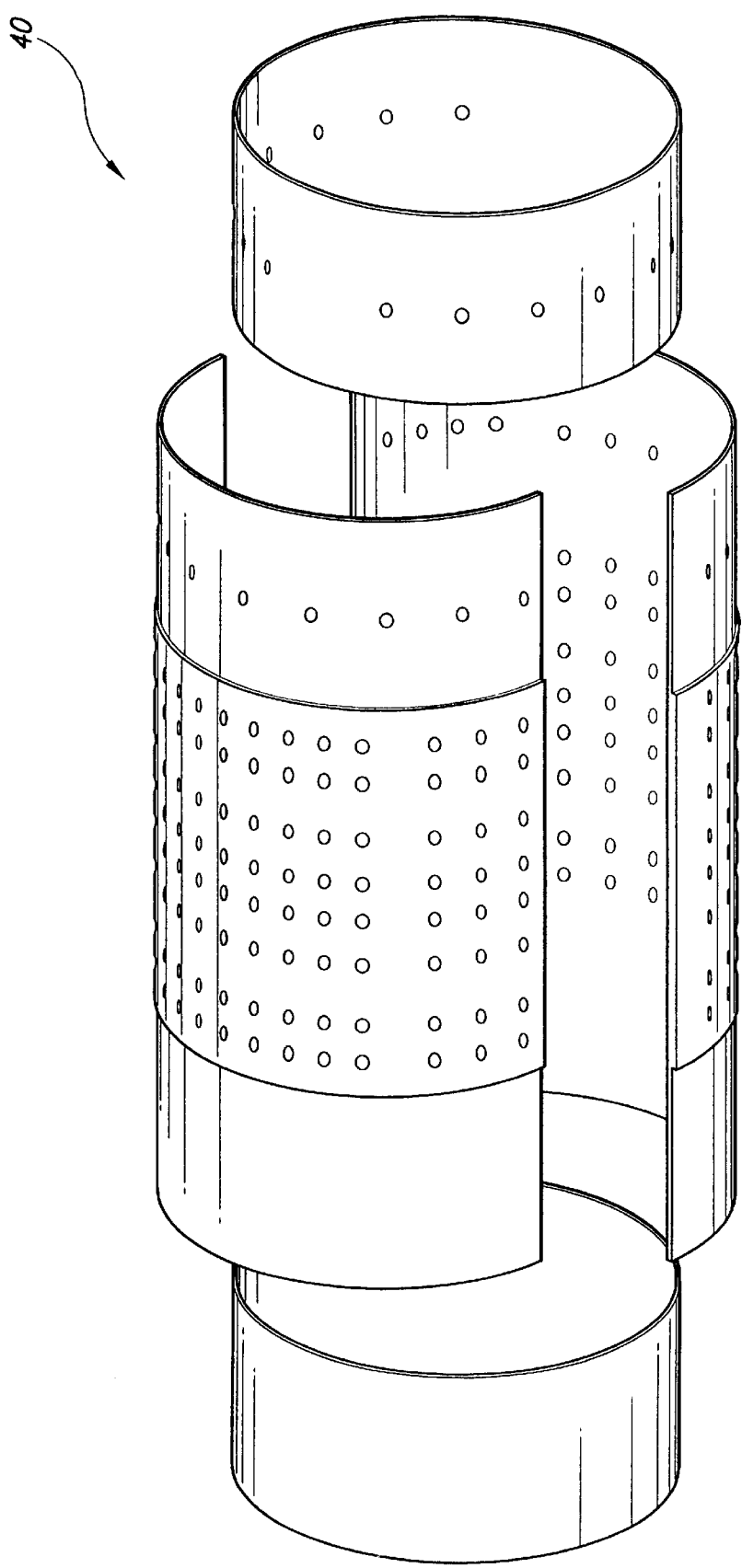
FIG. 9 is a perspective view showing a multi-piece shield.

The enclosure 10 may be formed of a continues tube or of a plurality rings aligned end-to-end. To facilitate axial positioning of the enclosure rings, the enclosure shield 40 is preferably provided with shallow ridges as guides for locating the enclosure rings. Shallow circumferential grooves are machined into the outer surface of the shield 40, and the regions between adjacent grooves form circumferential ridges. The shield 40 may also be provided with openings 45 for the poles 36 as shown in FIG. 8.

With the enclosure shield of the invention, transverse shear loads generated by non-uniform centrifugal radial forces in a generator rotor can be reduced while providing adequate electromagnetic shielding for the field winding. The ventilation holes enable ventilation gas discharge, and shallow ridges may be provided that serve as axial positioning guides for enclosure rings. Additionally, the enclosure shield of the invention advantageously adds axial stiffness to the rotor.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An enclosure assembly in a generator including a rotor and a stator, the enclosure assembly comprising:
    a rotor enclosure formed of a non-metallic tube for containing a magnetic core and corresponding winding assemblies of the rotor, and
    an enclosure shield formed of an electrically conductive material shaped corresponding to an inside diameter of the rotor enclosure and comprising ventilation holes.

2. An enclosure shield according to claim 1, wherein the enclosure shield is formed of a plurality of pieces.

3. An enclosure shield according to claim 2, wherein each of the plurality of pieces comprises structure that extends into notches in the magnetic core.

4. An enclosure shield according to claim 2, wherein each of the plurality of pieces is sized to span a pole face of the magnetic core.

5. An enclosure shield according to claim 1, having a minimum thickness greater than an eddy current skin depth.

6. A rotor in a generator comprising:
    a magnetic core having at least two poles;
    a plurality of winding assemblies, one for each pole;
    an enclosure formed of a non-metallic tube housing and containing the core and the winding assemblies; and
    an enclosure shield disposed between the enclosure and the winding assemblies, wherein the enclosure shield is formed of an electrically conductive material and is shaped corresponding to an inside diameter of the enclosure, the enclosure shield including ventilation holes.

7. A rotor according to claim 6, wherein the enclosure shield is formed of a plurality of pieces.

8. A rotor according to claim 7, wherein each of the plurality of pieces comprises structure that extends into notches in the magnetic core.

9. A rotor according to claim 7, wherein each of the plurality of pieces is sized to span a pole face of the magnetic core.

10. A rotor according to claim 7, wherein the plurality of pieces adjoin along a quadrature axis and at an axial midpoint of the rotor.

11. A rotor according to claim 6, wherein the enclosure shield comprises a minimum thickness greater than an eddy current skin depth.

12. An enclosure shield for a rotor enclosure in a generator including a rotor and a stator, the enclosure being formed of a non-metallic tube for containing a magnetic core and corresponding winding assemblies of the rotor, the enclosure shield being formed of an electrically conductive material shaped corresponding to an inside diameter of the rotor enclosure and comprising ventilation holes, wherein the enclosure shield is formed of a plurality of pieces, and wherein each of the plurality of pieces comprises structure that extends into notches in the magnetic core.

\* \* \* \* \*